Nov. 22, 1966 J. J. LANDY 3,286,694
ANIMAL OPERATING BOARD AND CLAMP THEREFOR
Filed Jan. 18, 1965 2 Sheets-Sheet 1
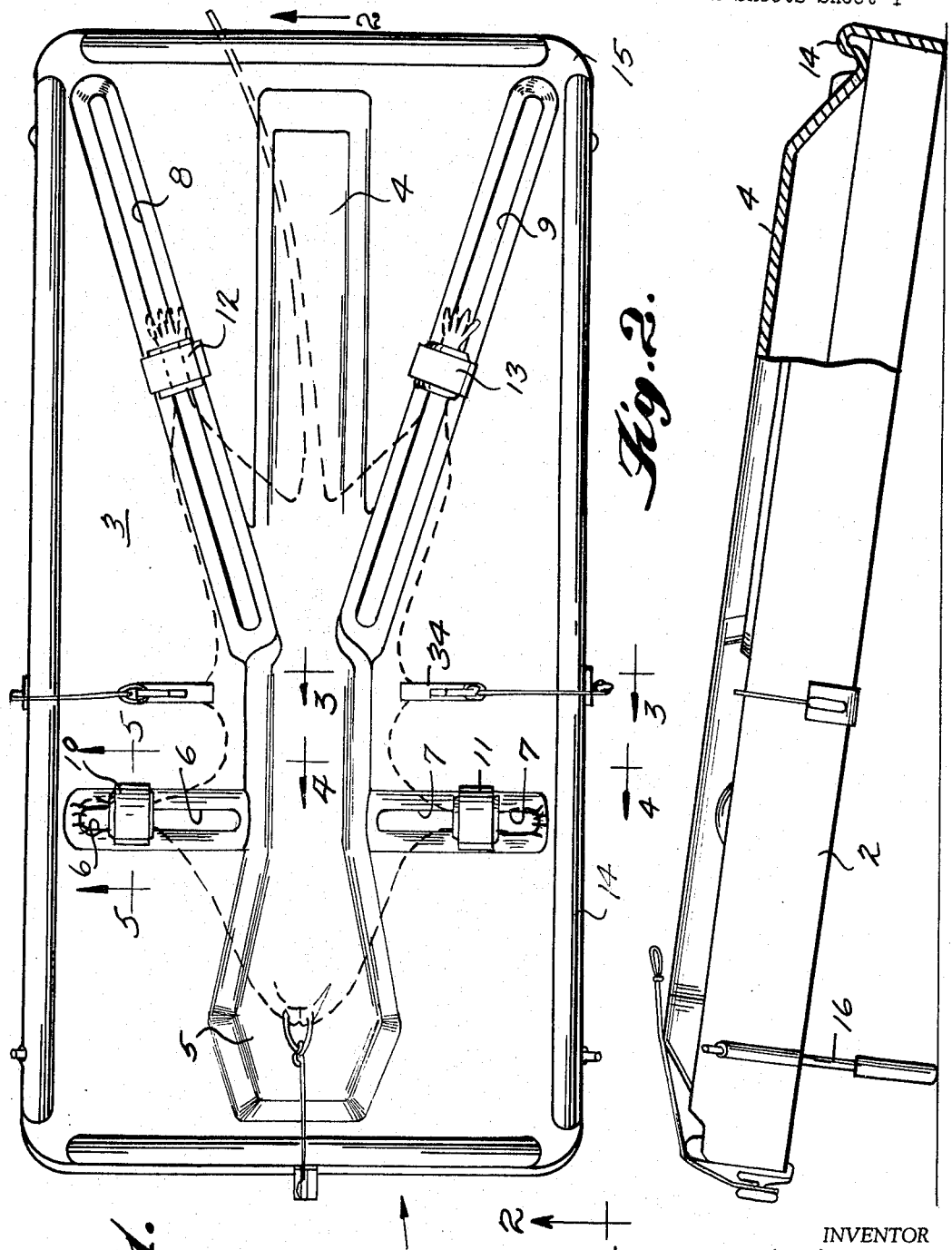
INVENTOR
JEROME J. LANDY
BY
Cushman, Darby & Cushman
ATTORNEYS Nov. 22, 1966     J. J. LANDY     3,286,694
ANIMAL OPERATING BOARD AND CLAMP THEREFOR
Filed Jan. 18, 1965     2 Sheets-Sheet 2
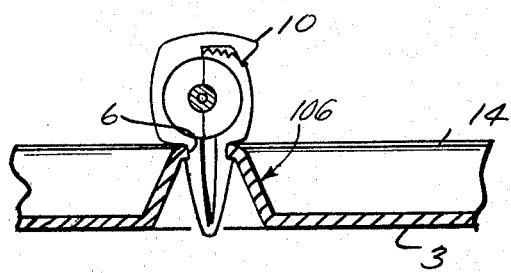
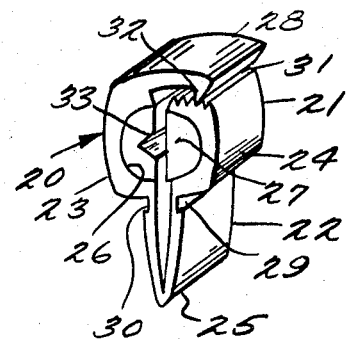
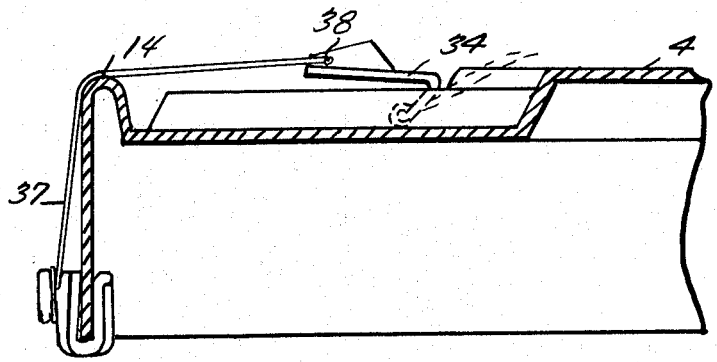
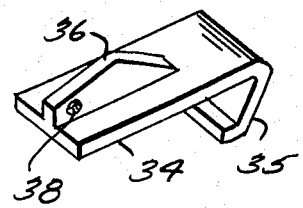
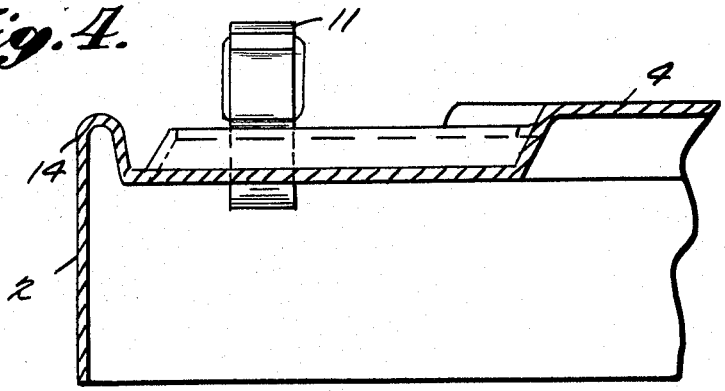
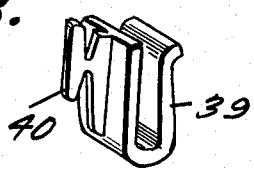
INVENTOR
JEROME J. LANDY
BY Cushman, Darby & Cushman
ATTORNEYS 3,286,694
ANIMAL OPERATING BOARD AND
CLAMP THEREFOR
Jerome J. Landy, 13700 SW. 78th Court, Miami, Fla.
Filed Jan. 18, 1965, Ser. No. 426,226
20 Claims. (Cl. 119—103)

The present invention relates to veterinary equipment and more particularly to an operating board for restraining animals such as mice and guinea pigs during surgery or other treatment and a clamp for use with the operating board.

The objects of the invention are to provide an animal operating board which is comfortable to the animal, easily and quickly handled by one person, effective to restrain the animal and inexpensive and easy to produce. The board is intended for such uses as surgery, necropsy, biopsy, injection, restraint, observation and disection.

Briefly stated, the operating board comprises a table having an area for receiving an animal, a plurality of fastening means on the table at the positions of the limbs of an animal in the said area, and clamping means which are fastened to the limbs of the animal and engageable with the fastening means in order to secure the animal to the board. In the preferred form, the clamps are removable from the board and may be secured to the animals first before placement on the board.

A more detailed description of these preferred forms of the invention follows, reference being made to the drawing in which:

FIGURE 1 is a plan view of the animal operating board of the present invention;

FIGURE 2 is a side view, partially in section along lines 2—2 of FIGURE 1, of the operating board;

FIGURE 3 is a partial view in cross section and on enlarged scale along lines 3—3 of FIGURE 1;

FIGURE 4 is a partial view in cross section and on enlarged scale along lines 4—4 of FIGURE 1;

FIGURE 5 is a partial cross section along lines 5—5 of FIGURE 1;

FIGURE 6 is a perspective view of a clamp according to the present invention;

FIGURE 7 is a perspective view of a retractor for use with the operating board; and FIGURE 8 is a perspective view of a cleat for use with the animal operating board.

The operating board comprises a table 1 having sides 2 and a top 3, which, in the embodiment for small animals may be about 15¾″ long and 7¾″ wide. This size is suitable for animals as small as a 14 gram mouse and as large as a 1150 gram guinea pig. It is also suitable for such animals as rats, hamsters, marmosets, chicks, kittens, birds, voles, frogs, small rabbits and gerbils. The table has an elevated area extending lengthwise along a median line which may be about ½″ higher than the table and constitutes a platform 4. The platform is generally rectangular, about 1″ wide except near one end where its sides diverge to a width of about 2½″ to provide and area 5 for the animal's head, which is about 4″ long.

The means for restraining the animal comprises 4 slots, 6, 7, 8 and 9 which extend across the table from the platform 4 and clamps 10, 11, 12 and 13 which are fastened to the animal's extremities and are engaged in the slots 6, 7, 8 and 9. The slots 6 and 7 are in a straight line and are approximately perpendicular to the median line of the platform 4. They are slightly below the diverging head area 5 of the table. Slots 8 and 9 diverge from platform 4, each at an angle of about 25° from the top platform so that there is an angle of about 50° between them, commencing at a point about 2½″ below the slots 6 and 7. The length of slots 6 and 7 is about 2¼″ each and of slots 8 and 9, about 7½″. It will be noted that the table is slightly elevated at the edges of the slots to prevent dripping of liquids through them, as indicated generally by the numeral 106 in FIG. 5.

The outer edges of the top 3 of the table are elevated to serve as a dam 14 preventing overflow of liquids, and there are depressions 15 in the dam at the corners of the board for drainage. A U-shaped wire rod 16 is fitted into openings in the bottoms of the sides of the table, to elevate one end, and liquids drain from the other end. For convenience, such openings are provided at both ends of the board, so that either end may be elevated.

Any suitable material may be used for the table 1, for example stainless steel or plastic. If a plastic material is employed, it may be one which has a high softening point such as polypropylene so that it may be sterilized in an autoclave. If a plastic material is used which has a lower softening point, e.g. polystyrene, sterilization requires a chemical agent, e.g. alcohol or formaldehyde.

A clamp 20 of a type suitable for holding an animal's extremity in one of the slots is illustrated in FIG. 6. It comprises a relatively wide head portion 21 near the top and a relatively narrower tail portion 22. It is split vertically into two side members 23 and 24 which are pivotally connected at the bottom 25 of the tail portion. The head portion has an opening 26 (i.e. the respective side members are concave) to receive a cushion 27, e.g. foam rubber, which is split into two portions secured in the respective side members. Side member 23 is somewhat higher than side member 24 and has a transverse member 28 which overlies the top of side member 24. The clamps may be comprised of a plastic material such polytetrafluoroethylene, polystyrene or polypropylene in which case the two sides 21 and 22 may be joined by an integral thin section of plastic at 25.

The clamps may be made by extrusion through a die whose shape corresponds to their cross section and slicing individual clamps from the extruded plastic shape.

As viewed in cross section, each of the tail portions is tapered to a narrow dimension near its bottom 25 to facilitate insertion of the clamp in one of the slots 6–9. There are grooves 29 and 30 adjacent the head portion, the width of which is about the same as the thickness of table 1.

The top of side member 24 is corrugated or serrated as indicated at 31 and there is a depending rib 32 which is triangular in cross section underneath the edge of the transverse member 28 which engages in the slots of the corrugated area 31. The transverse member 28 is tensioned against the corrugated area 31 and the triangular rib is pressed into one of the corrugations to resist movement between the tops of side members 23 and 24. This prevents an animal from opening the clamp, although it is readily manipulated by a person.

The respective tail portions of side members 23 and 24 are bowed apart, but are flexible and may be pressed together. Therefore, when the clamp is pressed into one of the slots 6–9 the tail members are squeezed together until the clamp is inserted to the depth of the grooves 29 and 30 whereupon the grooves will engage with the sides of the slot and snap into place. The slot is narrower than the normal width of the clamp, at that point, and the tail members are therefore under tension, to provide secure frictional engagement with the sides of the slot. Thereafter, it is not possible for an animal to move or release the clamp.

The dimensions of the clamp are not critical. However, it is preferred that the distance from the upper parts of the grooves 29 and 30 to the center of the head portion 21 be about equal to the height of the platform 4 over the slots 6–9 to provide maximum comfort for the animals. In the board described, this distance is about ¼". It may be necessary to cut V-shaped notches in the sides of the cushion 27, as shown at 33, to provide for the limbs of larger animals such as guinea pigs, but this is not necessary for smaller animals such as mice.

In use, the clamp is completely opened, i.e. the side members 23 and 24 are spread apart. One of the limbs of an animal is placed between the cushion members and the clamp is then closed. Then the tail portion of the clamp is pressed into the appropriate slot. Thus it is possible for one person to place the clamps about the animal's limbs while holding him in one hand and then to clamp him to the table without assistance.

Accessory equipment for use with the table is shown in the drawing, including an elastic cord, retractors and cleats for securing the cord to the edge of the table. The retractor 34 is of conventional design, being a hook 35 for drawing back tissue, and it is provided with a rib on its upper side for tying to the elastic cord 37. For example, the rib may have a hole 38 through it for insertion of the elastic cord, and a knot is tied in the free end of the cord to prevent pulling it through the hole.

The cleat 39 is a U-shaped clip of flexible metal or plastic which is tensioned to a closed position and is spread when placed over the lower edge of the table. It is provided with a protruding notched rib 40 to which the elastic cord is tied.

The cleat may be used to hold down the animal's head, if required, by holding one end of a piece of elastic cord, the other end of which is tied to one of the animal's teeth.

Various changes may be made in the preferred structure described above. For example, slots 6–9 might be replaced with a plurality of spaced openings positioned according to the sizes of laboratory animals, although this tends to limit the versatility of the operating board. The size of the board and its component parts may also be changed where larger or smaller animals are to be accommodated, the dimensions given above being for purposes of illustration only. As respects the clamps, it is possible to provide other means for securing the side members 23 and 24 together at both top and bottom; other types of clamps may be used, although those described above are particularly preferred, for ease of operation and simplicity of construction. Therefore, it is not intended to limit the scope of the invention to the structural forms described above for illustrative purposes, but only as defined by the appended claims.

I claim:

1. An operating board for small animals comprising a table having an area for receiving an animal, said table having a plurality of elongated slots extending way from said area in the general directions of the limbs of an animal on said area, and clamping means fastenable to said limbs and having means engageable within said slots, to secure said animal to said board and effectively restrain said animal, said table being elevated at the edges of said elongated slots to prevent drainage of liquid through said slots.

2. An operating board for small animals comprising a table having an area for receiving an animal, said table having a plurality of elongated slots extending away from said area in the general directions of the limbs of an animal on said area, and clamping means fastenable to said limbs and frictionally engageable at a plurality of positions along said slots in accordance with the size of said animal, to secure said animal to said board and effectively restrain said animal, said table being elevated at the edges of said elongated slots to prevent drainage of liquid through said slots.

3. An operating board as set forth in claim 2 in which said area comprises a raised platform on said table.

4. An operating board as set forth in claim 3 in which said platform is higher than said table at the edges of said slots and said clamping means to hold the animals' limbs above said slots at a height about the same as the height of said platform, to minimize the animal's discomfort.

5. An operating board as set forth in claim 2 in which said clamping means comprises a plurality of clamps, each of said clamps comprising a relatively wide head portion and a relatively narrow tail portion depending from said head portion, said head portion having an opening therethrough for receiving one of said limbs, and said tail portion being frictionally engageable within said slot.

6. An operating board as set forth in claim 5 in which said clamp is split vertically and comprises a pair of side members pivotally connected at their lower ends.

7. An operating board as set forth in claim 6 in which the tail portions of said side members are normally bowed apart but are flexible and can be compressed together to engage in said slots.

8. An operating board as set forth in claim 7 in which there is a groove in at least one of the tail portions of said side members, said groove being at least as wide as the thickness of said table and engaging with the side of said slot.

9. An operating board as set forth in claim 6 in which said clamp includes means near the top thereof for securing said side members together.

10. An operating board as set forth in claim 9 in which said securing means comprises a laterally-extending member on one of said side members which overlies the top of the other of said side members, and a depending member on said laterally-extending member, said top of said other side member having a depression which receives said depending member, and said laterally-extending member being tensioned toward said top.

11. An operating board as set forth in claim 10 in which said top has a plurality of laterally-spaced depressions, each adapted to receive said depending member, thereby permitting adjustment of the width of said opening in said head portion.

12. An operating board as set forth in claim 5 in which there is a cushion means within said opening, said cushion means having an opening through it to receive one of said limbs.

13. A clamp for securing the limb of a small animal to an operating board comprising a relatively wide head portion and a relatively narrow tail portion depending from said head portion, said head portion having an opening therethrough for receiving one of said limbs, and said tail portion being narrower than said head portion and engageable within a slot in an animal operating board, said clamp being split vertically and thereby comprising a pair of side members, pivotally connected at their lower ends.

14. A clamp as set forth in claim 13 in which the tail portions of said side members are normally bowed apart but are flexible and can be compressed together to frictionally engage in slots in said operating board.

15. A clamp as set forth in claim 14 in which there is a groove in at least one of the tail portions of said side members, said groove being at least as wide as the thickness of said operating table and being engageable with the side of a said slot.

16. A clamp as set forth in claim 13 including means near the top thereof for securing said side members together.

17. A clamp as set forth in claim 16 in which said securing means comprises a laterally-extending member on one of said side members which overlies the top of the other of said side members and a depending member on said laterally-extending member, said top of said other side member having a depression which receives said depending member and said laterally-extending member being tensioned toward said top.

18. A clamp as set forth in claim 17 in which said top has a plurality of laterally-spaced depressions adapted to receive said depending member, thereby permitting adjustment of the width of said opening in said head portion.

19. A clamp as set forth in claim 13 including cushion means within said opening, said cushion means having an opening through it to receive one of said limbs.

20. An operating board as set forth in claim 2 wherein said clamping means comprises a plurality of clamps, each clamp being split vertically and comprising a pair of side members pivotally connected at their lower ends, there being an opening between said side members remote from said lower ends to receive one of said limbs and the lower portions of said side members being frictionally engageable in said slots, whereby insertion of one of said clamps in one of said slots causes said side members to engage said limb and restrain the animal.

References Cited by the Examiner
UNITED STATES PATENTS

| | | | |
|---|---|---|---|
| 1,404,173 | 1/1922 | Barnard | 119—103 |
| 1,822,206 | 9/1931 | Ferguson | 269—327 |
| 2,279,012 | 4/1942 | Packchanian | 119—103 |
| 2,829,622 | 4/1958 | Borthwick | 119—103 |
| 2,832,313 | 4/1958 | Toepel | 119—103 |
| 2,987,042 | 6/1961 | Rothberg | 119—103 |
| 3,023,734 | 3/1962 | Schaub | 119—99 |
| 3,215,834 | 11/1965 | Tayman | 269—328 |

SAMUEL KOREN, *Primary Examiner.*

ALDRICH F. MEDBERY, *Examiner.*